US012604244B2

(12) United States Patent
Yang et al.

(10) Patent No.: US 12,604,244 B2
(45) Date of Patent: Apr. 14, 2026

(54) METHOD USED BY WIRELESS COMMUNICATION DEVICE FOR CONNECTING TO ACCESS POINT AND WIRELESS COMMUNICATION DEVICE USING THE SAME

(71) Applicant: Moxa Inc., New Taipei (TW)

(72) Inventors: Chang-Mou Yang, New Taipei (TW); Hsu-Yao Tsai, New Taipei (TW); Ming-Chuang Chen, New Taipei (TW)

(73) Assignee: Moxa Inc., New Taipei City (TW)

( * ) Notice: Subject to any disclaimer, the term of this patent is extended or adjusted under 35 U.S.C. 154(b) by 282 days.

(21) Appl. No.: 18/516,952

(22) Filed: Nov. 22, 2023

(65) Prior Publication Data

US 2025/0168726 A1 May 22, 2025

(51) Int. Cl.
*H04W 36/00* (2009.01)

(52) U.S. Cl.
CPC ... *H04W 36/0094* (2013.01); *H04W 36/0069* (2018.08); *H04W 36/008355* (2023.05)

(58) Field of Classification Search
CPC ......... H04W 36/0094; H04W 36/0069; H04W 36/008355; H04W 36/008375; H04W 36/08
USPC ...................................................... 455/432.1
See application file for complete search history.

(56) References Cited

U.S. PATENT DOCUMENTS 9,178,722 B1   11/2015   Gong
10,959,293 B2   3/2021   Rom et al.

11,284,473 B2   3/2022   Qiu et al.
2011/0216692 A1*   9/2011   Lundsgaard ........ H04W 36/304
  370/328
2012/0300746 A1*   11/2012   Ibrahim .............. H04W 36/302
  370/331
2018/0352489 A1*   12/2018   Anchan ................. H04W 48/16
2019/0239235 A1*   8/2019   Pefkianakis ........ H04W 72/563
2022/0330136 A1   10/2022   Siraj et al.
2023/0091127 A1*   3/2023   Lin ......................... H04W 8/02
  455/432.1

(Continued)

FOREIGN PATENT DOCUMENTS

CN   105657760   3/2019
CN   111726837   4/2022
EP   3123783   3/2018

(Continued)

*Primary Examiner* — Hirdepal Singh
(74) *Attorney, Agent, or Firm* — JCIPRNET

(57) ABSTRACT

In an aspect, the disclosure is directed to a wireless communication device which includes at least but not limited to: a wireless transceiver; and a processor coupled to the wireless transceiver and configured at least to: establish a first wireless connection to a first access point via the wireless transceiver, determine whether the first wireless connection of the wireless communication device has met a roaming criteria, having met the roaming criteria, obtain a subset of historical record stored in the wireless communication device according to the first access point, rank access points in the subset of historical record to generate a list of ranked access points by obtaining a score of the access point based on the historical record, select a second access point according to the list of ranked access points, and establish a second wireless connection to the second access point via the wireless transceiver.

16 Claims, 6 Drawing Sheets

(56)             References Cited

U.S. PATENT DOCUMENTS

2024/0388990 A1 *  11/2024  Lovison ................. G06N 20/00

FOREIGN PATENT DOCUMENTS

| | | |
|---|---|---|
| JP | 2009508363 | 2/2009 |
| JP | 2015526986 | 9/2015 |
| JP | 2016535475 | 11/2016 |
| JP | 2022037847 | 3/2022 |
| TW | 201931943 | 8/2019 |

* cited by examiner

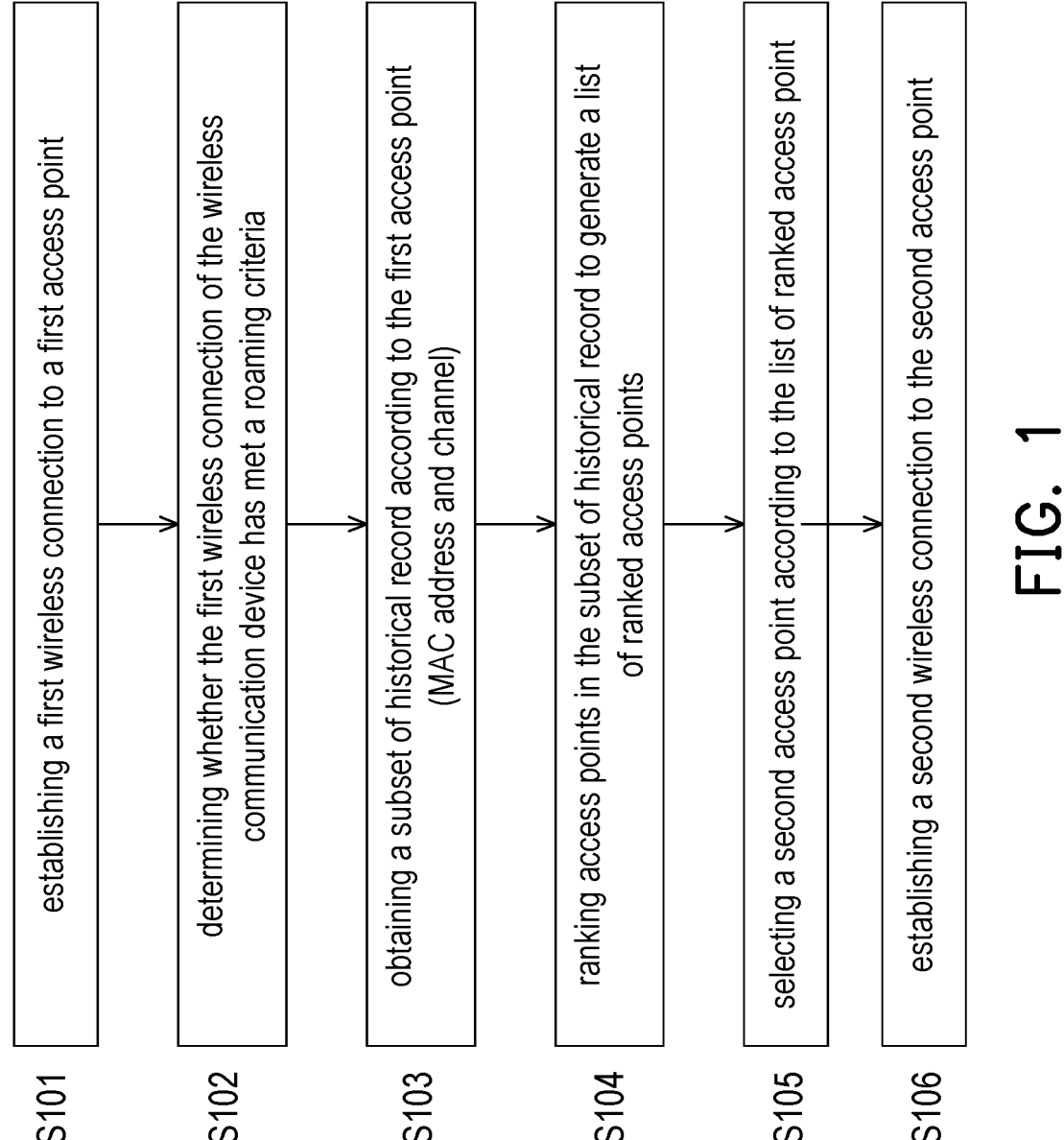

S101 establishing a first wireless connection to a first access point

S102 determining whether the first wireless connection of the wireless communication device has met a roaming criteria S103 obtaining a subset of historical record according to the first access point (MAC address and channel)

S104 ranking access points in the subset of historical record to generate a list of ranked access points S105 selecting a second access point according to the list of ranked access point S106 establishing a second wireless connection to the second access point

FIG. 1

| | First criteria | Second criteria | Third criteria | Fourth criteria | Score |
|---|---|---|---|---|---|
| Weight | W1 | W2 | W3 | W4 | |
| AP3 | first roaming record | First RSSI | First Noise Floor | First channel utilization | Cumulative score for AP3 |
| AP4 | second roaming record | Second RSSI | Second Noise Floor | Second channel utilization | Cumulative score for AP4 |
| AP5 | third first roaming record | Third RSSI | Third channel utilization | Third channel utilization | Cumulative score for AP5 |

FIG. 6

METHOD USED BY WIRELESS COMMUNICATION DEVICE FOR CONNECTING TO ACCESS POINT AND WIRELESS COMMUNICATION DEVICE USING THE SAME

TECHNICAL FIELD

The disclosure is directed to a method used by a wireless communication device for connecting to an access point and a wireless communication device using the same method.

BACKGROUND

A wireless communication device such as a mobile phone, a laptop, tablet, or a like device has the advantage of being mobile, and the mobile nature of a wireless communication device may require its network connection to be wireless in order for such wireless communication device to travel over a long distance while staying connected to the network. After a wireless communication device has connected to a wireless access point (AP) such as a WiFi access point, a router, a converter, a repeater, or any similar device, the wireless communication device may enter into a roaming mode and start to scan for alternative channels belong into another AP after the signal strength of a wireless connection to the AP has dropped below a certain threshold.

However, as a scanning is taking place while the wireless communication device is in a roaming mode, the signal strength of the wireless connection to the original AP may continue to drop. As the signal strength of the wireless connection to the original AP drops, the data rate of the wireless connection would also drop correspondingly. For example, if the signal strength of a wireless connection drops by −7.5 decibel (dB), the transmission speed may drop from 270 megabits per second (Mbps) to 108 Mbps. If an alternative AP is not quickly found or if the scanning takes too long, the signal quality would unlikely improve. However, under some circumstances, even if the wireless communication device is able to switch to another AP fairly quickly after entering into the roaming mode, the transmission quality may remain poor due to the selection of AP being suboptimal caused by the scanning result being outdated. The scanning result may very quickly become outdated if the wireless communication device is situated within a fast moving vehicle or if the moving distance of the wireless communication device is very long or if the scanning duration takes too much time, or so forth. Besides lowing the moving speed of the wireless communication device, a technique to resolve such issue may include reducing the number of channels for scanning. The advantage of such technique is to decrease the scanning time at the cost of lowering the system bandwidth.

Moreover, the task of scanning for a channel might take a lot of time. Currently, each dynamic frequency selection (DFS) channel may require at least 300 millisecond (ms) for a scan to complete, and each non-DFS channel may require 100 ms for a scan to complete. If a wireless communication device has to scan for 15 non-DFS channels and 16 DFS channels, it may require about 100 ms*15+300*16=6300 ms to complete a round of scans. The long scanning time could be problematic if the wireless communication device is travelling at a high speed. Assuming that the wireless communication device is travelling at a train speed of 22 m/s, it can travel 79.2 meters after 3.6 seconds. Such long distance may cause a decrease in signal strength and reduce transmission quality since the wireless communication device may have been moved away from its last connected AP.

Also, the fast moving speed may lead to the requirement for a faster sampling speed, hence the number of channels to be scanned may need to be reduced in order to decrease the scanning time. However, reducing the number of channels to be scanned would cause the overall system bandwidth available to the user reduced. Assuming that, the user can use 20 channels originally, limiting the channels to be scanned to only 3 channels would reduce the system bandwidth is only 3/20=15% leading to a lower network capacity. This would lead to a user having to compromise between the traveling speed and the usable network capacity.

SUMMARY OF THE DISCLOSURE

Accordingly, disclosure is directed to a method used by a wireless communication device for connecting to an access point and a wireless communication device using the same method.

In an aspect, the disclosure is directed to a method used by a wireless communication device for connecting to an access point. The method includes at least but not limited to: establishing a first wireless connection to a first access point; determining whether the first wireless connection of the wireless communication device has met a roaming criteria; having met the roaming criteria, obtaining a subset of historical record stored in the wireless communication device according to the first access point; ranking access points in the subset of historical record to generate a list of ranked access points by obtaining a score of the access point based on the historical record; selecting a second access point according to the list of ranked access points; and establishing a second wireless connection to the second access point.

In an aspect, the disclosure is directed to a wireless communication device which includes at least but not limited to a wireless transceiver electrically connected to a processor. The processor is configured at least to establish a first wireless connection to a first access point via the wireless transceiver, determine whether the first wireless connection of the wireless communication device has met a roaming criteria, having met the roaming criteria, obtain a subset of historical record stored in the wireless communication device according to the first access point, rank access points in the subset of historical record to generate a list of ranked access points by obtaining a score of the access point based on the historical record, select a second access point according to the list of ranked access points, and establish a second wireless connection to the second access point via the wireless transceiver.

In order to make the aforementioned-features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 illustrates a method used by a wireless communication device for connecting to an access point according to an exemplary embodiment of the disclosure.

FIG. 6 illustrates an example of applying a simple additive weighting method for determining the AP having the highest score according to an exemplary embodiment of the disclosure.

DETAILED DESCRIPTION OF DISCLOSED EMBODIMENTS

Figure 2:
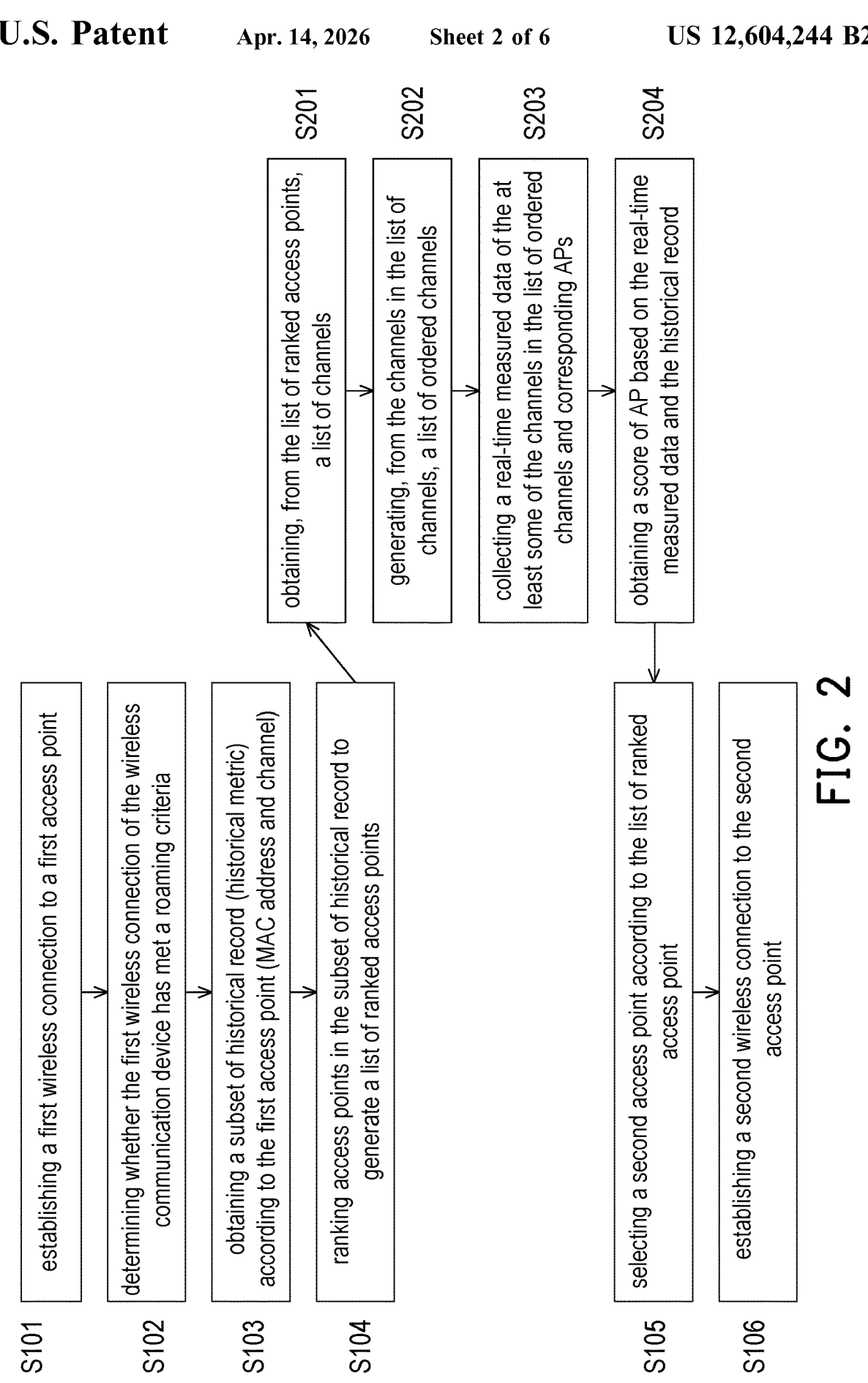
FIG. 2 illustrates a method used by a wireless communication device for connecting to an access point according to a first exemplary embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

In the following disclosure, a measurement data for AP or channel is measured and recorded by a wireless communication device. For each AP, the measurement data may include one or more factors, such as the signal strength measured typically in terms of decibel (dB), the received signal strength indication (RSSI), the signal to noise ratio (SNR), the channel state information (CSI), a distance information obtained via 802.11 mc Fine Timing Measurement (FTM)/Timestamp (TM), a CSI, a SNR, a RSSI and so forth. For each channel, the measurement data may include one or more factors, such like spectrum analysis result, a noise floor, a channel utilization, and a number of APs operating on the channel. The spectrum analysis result is for providing information related to interference on the channel. Each entry in the historical record could be keyed by a media access control (MAC) address of an AP while the measurement data of the channel is also recorded for each AP operating on the channel. For instance, assuming that both AP1 and AP2 are operating on channel 6 with a channel utilization of 50%, the historical record would log such record as:

AP1 MAC, Channel 6, Channel Utilization 50%
AP2 MAC, Channel 6, Channel Utilization 50%
    The factors of the measurement data may be various according to design, here is not limited thereto.

A metric may be obtained according to one of the factors of the measurement data for AP or channel. For example, one of the factors is chosen as the metric, or, a plurality of the factors are summed by simple additive weighting to obtain the metric, it is not limited herein.

A historical record, stored in the wireless communication device, is a set of the past measurement data. The historical record may include measured data of channel associated with each AP in the list of APs. When the wireless communication device was connected to an AP (e.g. first AP), the past measurement data of other APs were recorded in the wireless communication device as well, where the past measurement data of other APs were recorded to the wireless communication device are called "a subset of the historical record". That is, each of the subsets of the historical record is corresponding to different connected APs respectively.

As described previously, a wireless communication device moving at a speed may need to switch from a first (wireless) AP to a second (wireless) AP in order to stay connected to the network as the wireless communication device could be, for example, moving away from the first AP or experiencing a worsening channel condition between the wireless communication device and the first AP. The wireless communication device may need to switch to the second AP when the wireless communication device has met the roaming criteria. Assuming that after the wireless communication device has been attached to a first AP, the wireless communication device may detect a first measurement data of the first AP. measurement data. The roaming criteria may include one of more of, for example a signal strength threshold, a RSSI threshold, a SNR threshold, a CSI threshold, and so forth. When the first wireless connection between the wireless communication device and the first AP has met the roaming criteria (e.g. the RSSI of the first wireless connection has fallen below the RSSI threshold or any other of the first metrics no longer meets its respectively threshold), then the wireless communication device may need to seek a candidate AP as the second AP in order to stay connected to the network. To effectively stay connected to the network, the disclosure provides a method used by a wireless communication device for connecting to an access point and a wireless communication device using such method.

One of the inventive concepts is shown in the flow chart of FIG. 1. Referring to FIG. 1, in step S101, it is assumed that the wireless communication device has established a first wireless connection to a first access point.

In step S102, the wireless communication device would determine whether the first wireless connection of the wireless communication device has met the roaming criteria according to a real-time measurement data. For example, the wireless communication may continuously or periodically detect a SNR or the RSSI of the first wireless connection device so as to determine whether the SNR has fallen below a SNR threshold or whether the RSSI has fallen below the RSSI threshold. In another example, a metric may be further obtained according to the measurement data for the first wireless connection, and the wireless communication device determines whether the metric of the wireless communication device has met the roaming criteria.

In step S103, having met the roaming criteria, the wireless communication device may obtain a subset of a historical record according to the first access point. In other words, after the roaming criteria has been met, the situation triggers the wireless communication device to search for a candidate AP among a list of APs according to the subset of the historical record. In this example, the wireless communication device is connected to the first AP in step S101, accordingly, the subset of the historical record is the past measurement data of each AP recorded by the wireless communication device when it connected to the first AP.

In step S104, the wireless communication device may perform a ranking of access points in the subset of the historical record to generate a list of ranked access points by obtaining a score of the AP based on the historical record. The ranking of access points may not be performed to the entire list of APs but to a portion of APs such as by filtering the list of APs with a predefined criteria. For example, any AP in the list of APs having a channel utilization of greater than 90% could be filtered out. For the APs not filtered out, the respective metrics of the APs are obtained according to the past measurement data. The ranking for these APs could be performed based on a ranking of its respective metric. Since there could be multiple metrics of one AP, the ranking of APs could be performed based on the metrics via a simple additive weighting method or a multilevel sort. The additive weight method could be implemented by a summation of weighted multiple metric, wherein each metric is multiplied by a predetermined weight (e.g. weight 1*first metric+ weight 2*second metric+ . . . =score). After the score has been calculated for each AP which was not filtered out, the APs are ranked according to its respective score.

In step S105, the wireless communication device may select a second AP according to the list of ranked access point. Step S105 could be implemented based on first exemplary embodiments or a second exemplary embodiment to be explained later. In step S106, after the second AP has been selected, the wireless communication device may establish a second wireless connection with the second AP and subsequently sever the first wireless connection.

For the first exemplary embodiment, the wireless communication device may select the second AP by obtaining real-time measurement data (i.e. performing scans) for APs based on the list of ordered channels. In step S201, the wireless communication device may obtain, based on the list of ranked access point, a list of channels. In other words, each AP in the list of ranked APs has been previously assigned with a channel which constitutes the list of channels to be ordered. In step S202, the wireless communication device may generate, from the list of channels, a list of ordered channels. The channels could be ordered according to a sequence consistent with the list of ranked APs. In step S203, the wireless communication device may collect, in a sequence consistent with an order as the list of ordered channel list, a real-time measurement data and corresponding metric of the at least some of the channels in the list of ordered channels and corresponding APs. It should be noted that, the channel list is based on an order specified in the list of ranked APs, the AP having the better historical score is scanned ahead of AP(s) having worse historical score. In step S204, the wireless communication device obtains a score of AP based on the real-time measurement data and the historical record.

In detail, to obtaining real-time measurement data for the APs, the wireless communication may perform action (such as scan FTM and etc.) to obtain real-time measurement data for some or all of the channels in the ordered channel list based on an order specified in the list of ordered channels.

To be specific, the wireless communication device may hop to a channel in the first of ordered channels and then perform scanning, FTM and etc. Spectral scanning and channel analysis may be also performed sequentially or simultaneously. Then the wireless communication device may hop to the second channel in the second of the ordered channels and perform scanning. Similarly, the wireless communication device may hop to the rest of the channels and perform the scanning respectively. The real-time measurement data is applied to the AP associated with the channel. For example, if AP1 and AP2 are on channel 1, the real-time record of channel would be recorded for both AP1 and AP2.

Accordingly, a real-time score of each APs could be obtained according to the real-time measurement data of the channel and its corresponding metric via scanning, and a real-time ranking can be performed by the wireless communication device according to the real-time score of each APs and the ranking of historical record. In another example, the real-time score of each APs could be obtained according to both the real-time measurement data via scanning and its corresponding metric and the past measurement data and its corresponding metric, here is not limited thereto.

According to the step S204, based on the metric obtained the scanned APs and the scanned channels, the wireless communication device may calculate scores of AP associated with some or all of the channels in the ordered channel list by applying a weighted sum of some or all of the collected real-time metrics as well as metric stored in the historical record for each of the some or all of the channels. Moreover, the wireless communication device may not obtain real-time metric for all the channels in the list of ordered channels but may only need to obtain real-time metric for a predetermined number of channels as well as for a predetermined number of associated APs. Specific Examples will be provided later in this disclosure. Since the wireless communication device may not obtain real-time measurement data for all the channels in the list of ordered channels but may only need to obtain real-time measurement data for a predetermined number of channels as well as for a predetermined number of associated APs, the time for switching to another AP is saving. Specific Examples will be provided later in this disclosure.

Figure 3:
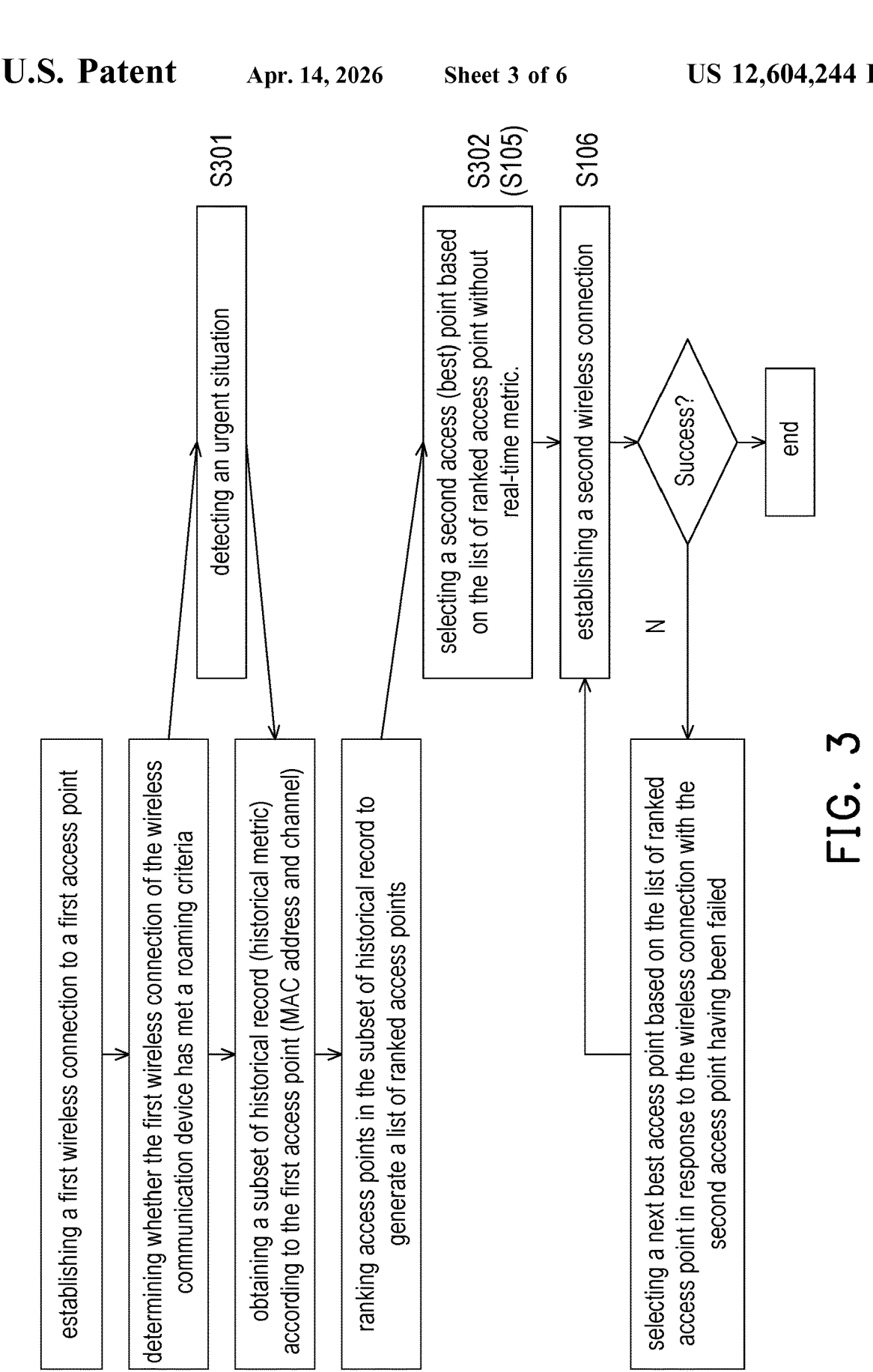
FIG. 3 illustrates a method used by a wireless communication device for connecting to an access point according to a second exemplary embodiment of the disclosure.

For the second exemplary embodiment, it is applicable to an urgent situation such as when the wireless communication has lost or on the verge of losing its network connection and urgently needs to connect to an alternative AP. Referring to FIG. 3, in step S301, the wireless communication device has detected an urgent situation (e.g. connection lost or the RSSI/SNR far below the RSSI/SNR threshold). In step S302, the wireless communication device may select an AP solely based on the list of ranked access points generated from step S104 without requiring any real-time measurement data (i.e. without performing scans or measurements). For instance, without obtaining real-time measurement data, the wireless communication device may select and connect an AP having the best historical score according to the list of ranked access point. In step S303, if the connection to the AP having the best historical score has failed, the wireless communication device may select and connect to an AP having the next best score according to the list of ranked access points. Essentially, according to the second exemplary embodiment, in response to the roaming criteria having been met, the wireless communication device may refer to a past measurement data recorded in a storage device (e.g. S103, S104 of FIG. 2) to generate the list of ranked AP list. Next, the wireless communication device may select a candidate AP from the historical record based whichever AP having a best score from ranked AP list. The decision could be made without performing any measurement for real-time metric or could be made by performing few measurement as long as the result of the measurement is acceptable.

Figure 4:
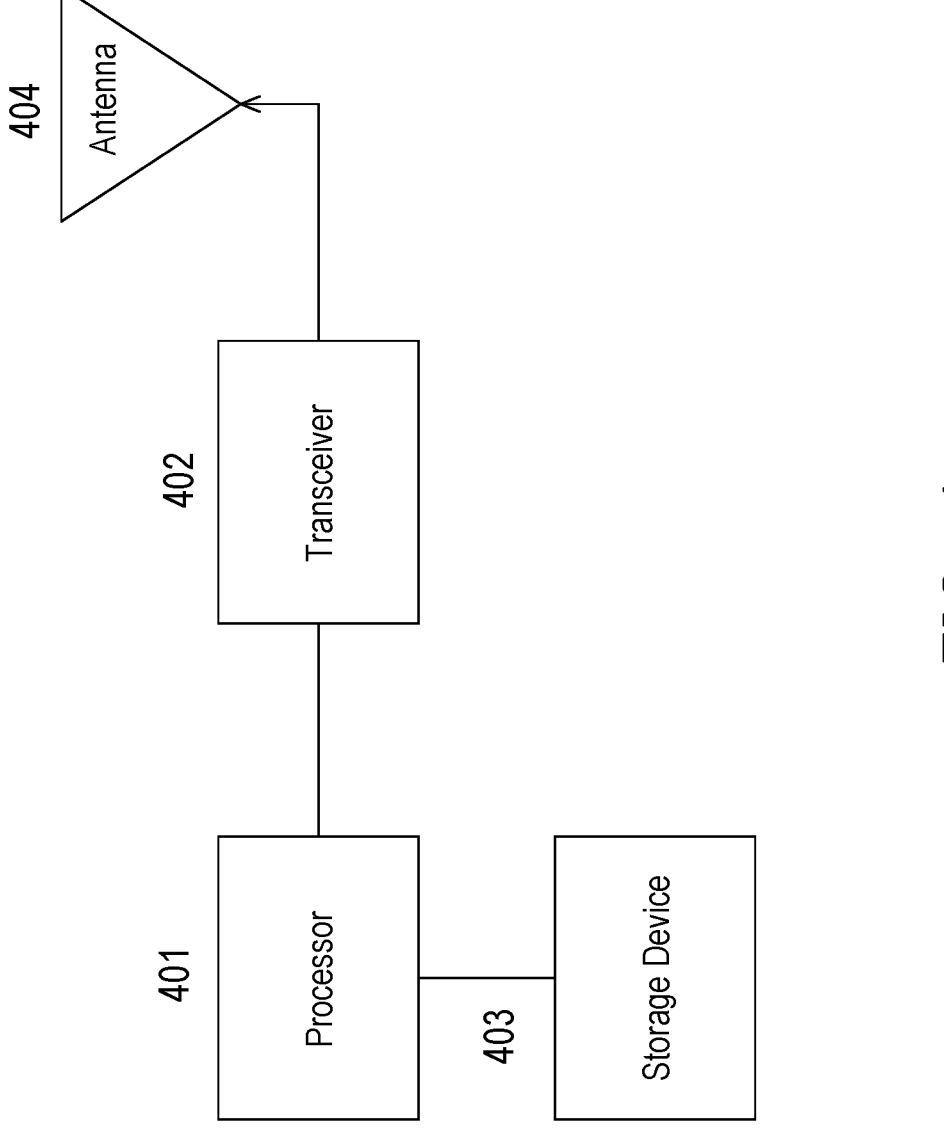
FIG. 4 illustrates a hardware block diagram of a wireless communication device according to an exemplary embodiment of the disclosure.

FIG. 4 illustrates the hardware block diagram of a wireless communication device 400 according to an exemplary embodiment of the disclosure. The wireless communication device may include not limited to a processor 401 connected to a transceiver 402 and a storage device 403. The processor 401 could be a central processing unit (CPU), a microprocessor, a microcontroller, a field programmable gate array (FPGA), a graphics processing unit (GPU), a customized integrated circuit, or a device having a similar function.

The transceiver 402 may include one or more wired or wireless transceiver module. For example, the transceiver 402 may include a wireless transceiver which enables the wireless communication device 400 to receive data in a RF or millimeter wave frequency. For example, the transceiver 402 may include a WiFi or Bluetooth transceiver meeting the 802.xx standard. For example, the transceiver 402 may include a USB port or an interface for facilitating a cabled connection. For example, the transceiver 402 may also include a short-range wireless transceiver such as a near field communication (NFC) transceiver.

The storage device 403 could be any non-volatile storage medium for non-volatile information storage such as flash memory, hard disk drive (HDD), read only memory (ROM), and etc. The information to be stored may include information such as the above described historical record and programming codes to be loaded into the processor 401 to perform functions describes in FIG. 1 to FIG. 3 as well as the specific examples of FIG. 5 and FIG. 6.

Figure 5:
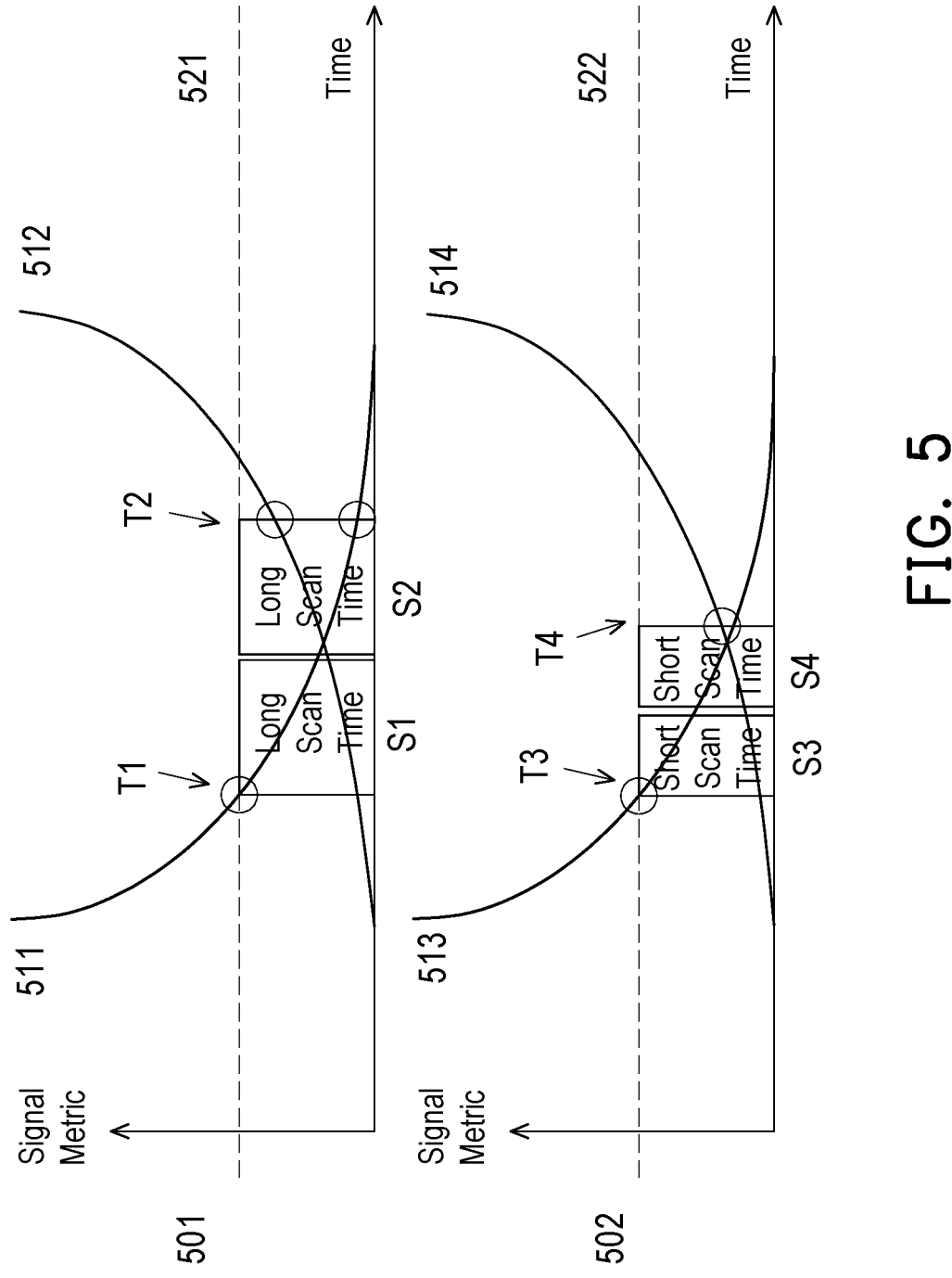
FIG. 5 illustrates a process of scanning for an access point according to an exemplary embodiment of the disclosure.

FIG. 5 shows a specific example related to the first exemplary embodiment. It is assumed that a wireless communication device (e.g. 400) is located in a moving or stationary environment and is connected to a first AP via a first wireless connection. In the first graph 501 of FIG. 5, it is assumed that it takes the time S1 to scan for full channels for one cycle, and it takes the time S2 to scan for channels for another cycle. The duration S1 and S2 currently could be about 6250 ms each assuming that there are 15 non-DFS channel and 16 DFS channel so that a scan of each of S1 and S2 may require, for example (15*150 ms+16*250 ms)=6250 ms each. If the scan time is too long, then by the time the wireless communication device has detected the metric 512 of the second access point at a second time point T2 being close to the roaming criteria 521, the metric 511 of the first AP may have dropped significantly due to the moving speed of the wireless communication device and thus the wireless communication device may lose its network connection.

The second graph 502 of FIG. 5 presents a solution to be above described problem by shortening the scan time from S1 and S2 to S3 and S4 respectively. In this way, while the metric 513 of the first AP may decrease as the wireless communication device is moving away from the first AP, when the wireless communication device detects the metric 514 of the first AP at a third time point T3 dropping below the roaming criteria 522, the wireless communication device may start to search for channels of an alternative AP for a time of S3 for one cycle and subsequently search for channels of an AP for a time of S4 for another cycle. Since the time of S3 and S4 are shorter, the wireless communication at the fourth time point T4 may find a suitable AP by detecting an acceptable real-time metric 514 of the second AP while the real-time metric 513 of the first AP has not dropped too low. Therefore, one of the aims of the disclosure is to enable the wireless communication to shorten the time for connecting to an alternative AP.

When a user activates the wireless function (e.g. WiFi) of a wireless communication device such as a laptop or mobile phone, there could be countless WiFi APs detected by the wireless communication device if it is located in a dense urban area. However, some of the channels or WiFi APs may have low metric and are thus low in the priority for the wireless communication device to connect to. In the present invention, it is disclosed to utilize a combination of historical record and real time data to not only filter out unwanted channels and APs but also re-prioritize the order of scanning channels of the access points. By filtering out unwanted channels of access points and by re-ordering the scanning order, the scan duration per scan cycle could be shortened.

In this way, detection time could be reduced so a full network capacity could be available for when operating under a higher speed.

As an example, it is assumed that the wireless communication device (e.g. 400) has been connected to the first AP through a first wireless connection which has met a roaming criteria (e.g. 521 522) (e.g. S101). For example, the SNR or the RSSI of the first wireless connection could be below a predetermined SNR threshold a predetermined RSSI threshold. The wireless communication device may keep determining whether the measurement data of the first wireless connection has met a roaming criteria (S102). Next, the wireless communication device may refer to its storage device (e.g. 403) to obtain a subset of historical record which contains a history of measurement data of APs and channels corresponding to the APs (S103). For example, the historical record may record AP1, AP2, AP3, AP4, AP5, and AP6 and their corresponding channels, the subset of historical record may be the record of APs during the communication device connected to first AP. Furthermore, AP1 and AP2 are filtered out since their channel utilization rate is greater than a predetermined channel utilization threshold which could be, for example, 90%. Next, a ranking of the APs in the subset of historical record to be performed based on their historical metric which has been recorded when measurements were performed in the past, and a ranking list of access points is generated accordingly (S104). In detail, the rank list of APs is in the following order which includes AP3 AP4 AP5 AP6 with AP3 having the best score. Next, it is assumed that AP3 corresponds to channel 36, AP4 corresponds to channel 11, AP5 corresponds to channel 36, and AP6 corresponds to channel 1 (S201), and thus the list of ordered channels (S202) would be the following order including channel 36, channel 11, and channel 1 based on the list of ranked APs. Since there is no duplicate channels in the list of ordered channels, the second instance of channel 36 (i.e. AP5 corresponds to channel 36) would not be included in the list of ordered channels.

Next, assuming that the wireless communication device has encountered a non-urgent situation, the wireless communication device would obtain real-time measurement data such as by performing scanning, FTM, and spectrum scans for channel 36, channel 11, and channel 1 and corresponding APs (S203). According to an exemplary embodiment, the wireless communication device may perform the scans in the same order as the list of ordered channels. This would mean that the order of the channel scans is in the order of channel 36, channel 11, and channel 1. To be more specific, the communication device firstly hops to the channel 36 and performs interaction (such as scan, FTM, etc.) of the channel 36 and the APs which is in the channel 36 (e.g. AP3 and AP5). Then the communication device hops to the channel 11 and performs interaction of the channel 11 and the APs which is in the channel 11 (e.g. AP4). Then the communication device hops to the channel 1 and performs interaction of the channel 1 and the APs which is in the channel 1 (e.g. AP6). According to an exemplary embodiment, the wireless communication device may perform the scans only for a portion of the listed or ordered channels and each of their corresponding APs. Thus, the wireless communication device may only need to perform scans for channel 36 and channel 11 and AP3 and AP4 without channel 1 and AP6.

After above-described collection of real-time measurement data and its corresponding metric has been performed, the wireless communication device may obtain a score of the APs based on the real time measurement data and the past measurement data (S204). The score could be based on simple additive weighting or other methods that can solve
Multi-Criteria Decision-Making (MCDM), such as:
machine learning, etc. After applying one or more of these
methods, each AP will be marked with a score. The wireless
communication device would select the AP having the
highest score for establishing a new wireless connection
(S205).

FIG. 6 shows an example of applying a simple additive
weighting method for determining the AP having the highest
score. As the same as the previous example, the candidate
APs for consideration includes AP3, AP4, and AP6, and four
criteria are used for ranking the APs, but it should be noted
that the disclosure does not limit the ranking of the APs to
these exact criteria. In this example, the first criteria is
roaming record from the historical record, the second criteria
is the RSSI, for each of AP3, AP4, and AP6, the third criteria
is the noise floor for channel 36, channel 11, and channel 1
which correspond AP3, AP4, and AP6, and the fourth criteria
is the channel utilization rate of channel 36, channel 11, and
channel 1. The second, third, and fourth criteria could either
be the historical metric or the measured real-time metric. For
each of the APs, the cumulative score is obtained by
multiplying each of the criteria with its respective weighting
coefficient. For example, the cumulative score for AP3 is
determined by the sum of multiplying the first roaming
record with a first weighting coefficient (W1), multiplying
the first RSSI with a second weighting coefficient (W2),
multiplying the first noise floor with a third weighting
coefficient (W3), and multiplying a fourth weighting coef-
ficient (W4) with the first channel utilization. Moreover, the
sum of the weighting coefficients W1, W2, W3, and W4 is
1. As an example, W1=0.2, W=0.15, W3=0.4 W4=0.25, but
the disclosure does not limit to these exact numbers as
weighting coefficients.

As another example, it is assumed that the wireless
communication device has detected an urgent situation
(S301) such as the first wireless connection with the first AP
is severed. In this example, the wireless communication
device would perform step S101~S103 and is assumed to
also obtain AP3, AP4, and AP3 in the list of ranked APs and
channel 36, channel 11, and channel 1 in the list of ordered
channels. Next, the wireless communication device may
select AP3 from the list of ranked APs since AP3 has the best
score according to the list of ranked access points generated
from Step 104. Accordingly, the wireless communication
device may connect to AP3 directly without performing any
measurement (S302). If the connection to AP3 has failed, the
wireless communication device may attempt to connect to
AP4 (S303) since AP4 has the next best score in the list of
ranked access points.

Moreover, the historical record could be updated on a
regular basis, and outdated channels or access points in the
historical record could be deleted. For instance, when wire-
less communication device has a wireless connection having
a sufficiently high metric such as having a SNR above a
threshold, the wireless communication device every prede-
termined period (e.g. 5 or 10 minutes) may perform a full
channel scan upon detectable channels and subsequently
update the historical record accordingly. After performing a
full scan, the APs having low scores could be removed from
the historical record. Also, APs that are undetectable or
could not be updated may also be removed from the his-
torical record. There is a predefined ageing time associated
with the historical record. For data obtained before the
predefined ageing time, it could be removed from the
historical record.

In view of the aforementioned-descriptions, the present
disclosure is suitable for being used in a wireless commu-
nication system and is able to shorten the time to connect to
a new access point in the event that the wireless communi-
cation device has met the roaming criteria.

No element, act, or instruction used in the detailed
description of disclosed embodiments of the present appli-
cation should be construed as absolutely critical or essential
to the present disclosure unless explicitly described as such.
Also, as used herein, each of the indefinite articles "a" and
"an" could include more than one item. If only one item is
intended, the terms "a single" or similar languages would be
used. Furthermore, the terms "any of" followed by a listing
of a plurality of items and/or a plurality of categories of
items, as used herein, are intended to include "any of", "any
combination of", "any multiple of", and/or "any combina-
tion of multiples of the items and/or the categories of items,
individually or in conjunction with other items and/or other
categories of items. Further, as used herein, the term "set" is
intended to include any number of items, including zero.
Further, as used herein, the term "number" is intended to
include any number, including zero.

It will be apparent to those skilled in the art that various
modifications and variations can be made to the structure of
the disclosed embodiments without departing from the scope
or spirit of the disclosure. In view of the foregoing, it is
intended that the disclosure cover modifications and varia-
tions of this disclosure provided they fall within the scope of
the following claims and their equivalents.

What is claimed is:

1. A method used by a wireless communication device for
connecting to an access point, the method comprising:
   establishing a first wireless connection to a first access
       point;
   determining whether the first wireless connection of the
       wireless communication device has met a roaming
       criteria;
   having met the roaming criteria, obtaining a subset of
       historical record stored in the wireless communication
       device, wherein the historical record includes a record
       of past measurement data of access points when the
       wireless communication device is connected to the first
       access point;
   ranking the access points in the subset of historical record
       to generate a list of ranked access points by obtaining
       a score of the access point based on the historical
       record;
   selecting a second access point according to the list of
       ranked access points; and
   establishing a second wireless connection to the second
       access point.

2. The method of claim 1, further comprising:
   obtaining, from the list of ranked access points, a list of
       channels, each of the channels in the list of channels
       corresponds to one of the access points in the list of
       access points;
   generating, from the channels in the list of channels, a list
       of ordered channels based on a sequence consistent
       with an order as the list of ranked access points.

3. The method of claim 2 further comprising:
   collecting a real-time measurement data for each of the at
       least some of the access points and at least some of the
       channels in the list of ordered channels, and
   obtaining a score of AP based on the collected real-time
       measurement data and the historical record, and
   selecting a second access point having a highest score.

4. The method of claim 3, wherein the real-time measurement data for each of the at least some of the access points comprising one or more of a distance information, a channel state information (CSI), a signal to noise ratio (SNR), and a received signal strength indication (RSSI).

5. The method of claim 3, wherein the real-time measurement data for each of the at least some of the channels in the list of ordered channels comprising one or more of a spectrum analysis result, a noise floor, a channel utilization, and a number of access points per channel.

6. The method of claim 1 further comprising:

detecting an urgent situation; and selecting the second access point according to the list of ranked access points comprising selecting the second access point according to the list of ranked access points without a real-time measurement data.

7. The method of claim 6 further comprising:

detecting the wireless connection with the second access point having been failed; and selecting a next best access point based on the list of ranked access point to address the second access point having been failed.

8. The method of claim 1, wherein the roaming criteria comprises at least one of a signal strength threshold, a signal to noise (SNR) ratio threshold, a received signal strength indication (RSSI) threshold, a channel state information (CSI) threshold, and a distance information threshold.

9. A wireless communication device comprising:

a wireless transceiver; and a processor coupled to the wireless transceiver and configured at least to:

establish a first wireless connection to a first access point via the wireless transceiver, determine whether the first wireless connection of the wireless communication device has met a roaming criteria, having met the roaming criteria, obtain a subset of historical record stored in the wireless communication device, wherein the historical record includes a record of past measurement data of access points when the wireless communication device is connected to the first access point, rank the access points in the subset of historical record to generate a list of ranked access points by obtaining a score of the access point based on the historical record, select a second access point according to the list of ranked access points, and establish a second wireless connection to the second access point via the wireless transceiver.

10. The wireless communication device of claim 9, wherein in response to generate the list of ranked access points, the processor is further configured to:

obtain, from the list of ranked access points, a list of channels, each of the channels in the list of channels corresponds to one of the access points in the list of access points, and generate, from the channels in the list of channels, a list of ordered channels based on a sequence consistent with an order as the list of ranked access points.

11. The wireless communication device of claim 10, wherein the processor is further configured to:

collect a real-time measurement data for each of the at least some of the access points and at least some of the channels in the list of ordered channels, and obtain a score of AP based on the collected real-time measurement data and the historical record, and select a second access point having a highest score.

12. The wireless communication device of claim 11, wherein the real-time measurement data for each of the at least some of the access points comprising one or more of a distance information, a channel state information (CSI), a signal to noise ratio (SNR), and a received signal strength indication (RSSI).

13. The wireless communication device of claim 11, wherein the real-time measurement data for each of the at least some of the channels in the list of ordered channels comprising one or more of a spectrum analysis result, a noise floor, a channel utilization, and a number of access points per channel.

14. The wireless communication device of claim 9, wherein the processor is further configured to:

detect an urgent situation; and in response to that the urgent situation is detected, the second access point is selected according to the list of ranked access points without a real-time measurement data.

15. The wireless communication device of claim 14, wherein the processor is further configured to:

select a next best access point based on the list of ranked access point in response to the wireless connection with the second access point having been failed.

16. The wireless communication device of claim 11, wherein the roaming criteria comprises at least one of a signal strength threshold, a signal to noise (SNR) ratio threshold, a received signal strength indication (RSSI) threshold, a channel state information (CSI) threshold, and a distance information threshold.

* * * * *